United States Patent [19]

Kärnä et al.

[11] Patent Number: 5,012,175
[45] Date of Patent: Apr. 30, 1991

[54] MEANS FOR ACID-FILLING AND FORMING

[75] Inventors: Toivo Kärnä, Porvoo; Kalevi Lind, Tampere, both of Finland

[73] Assignee: Neste Oy, Finland

[21] Appl. No.: 421,275

[22] Filed: Oct. 13, 1989

[51] Int. Cl.$^5$ .............................................. H02J 7/00
[52] U.S. Cl. ..................................... 320/2; 141/237; 429/72
[58] Field of Search ................. 320/2, 31; 429/72, 80; 29/623.1, 623.2; 141/102, 105, 106, 107, 234, 237, 238, 240, 285

[56] References Cited

U.S. PATENT DOCUMENTS

| | | | |
|---|---|---|---|
| 3,103,452 | 9/1963 | Comanor et al. | 429/72 |
| 4,079,761 | 3/1978 | Herbst, Sr. | 14/237 X |
| 4,215,307 | 7/1980 | Windisch et al. | 320/2 |
| 4,359,075 | 11/1982 | Eberle et al. | 141/238 X |
| 4,565,750 | 1/1986 | Isoi et al. | 429/72 |
| 4,604,564 | 8/1986 | Windisch et al. | 320/2 |
| 4,716,944 | 1/1988 | Eggers | 29/623.2 |
| 4,765,359 | 8/1988 | Burnett | 141/237 X |
| 4,782,279 | 11/1988 | Selanger | 429/72 X |
| 4,833,047 | 5/1989 | Isoi et al. | 429/72 |

FOREIGN PATENT DOCUMENTS

| 0871780 | 2/1953 | Fed. Rep. of Germany | 429/80 |
|---|---|---|---|
| 0133763 | 10/1980 | Japan | 141/238 |

Primary Examiner—Steven L. Stephan
Assistant Examiner—Kristine Peckman
Attorney, Agent, or Firm—Steinberg & Raskin

[57] ABSTRACT

Apparatus for acid-filling and forming of storage batteries has a frame which is arranged to hole several storage batteries (30) simultaneously. In the frame a duct system (18-25) is in direct contact with the cells (35) of each storage battery (30) fixed in the frame. The duct system supplies acid simultaneously into each storage battery (30) and a circuit (13) simultaneously supplies charging current to the terminals of each storage battery with the electrical interconnection between the terminals of each battery (30) and the circuit (13) being made by installing the respective battery (30) within the frame.

8 Claims, 3 Drawing Sheets

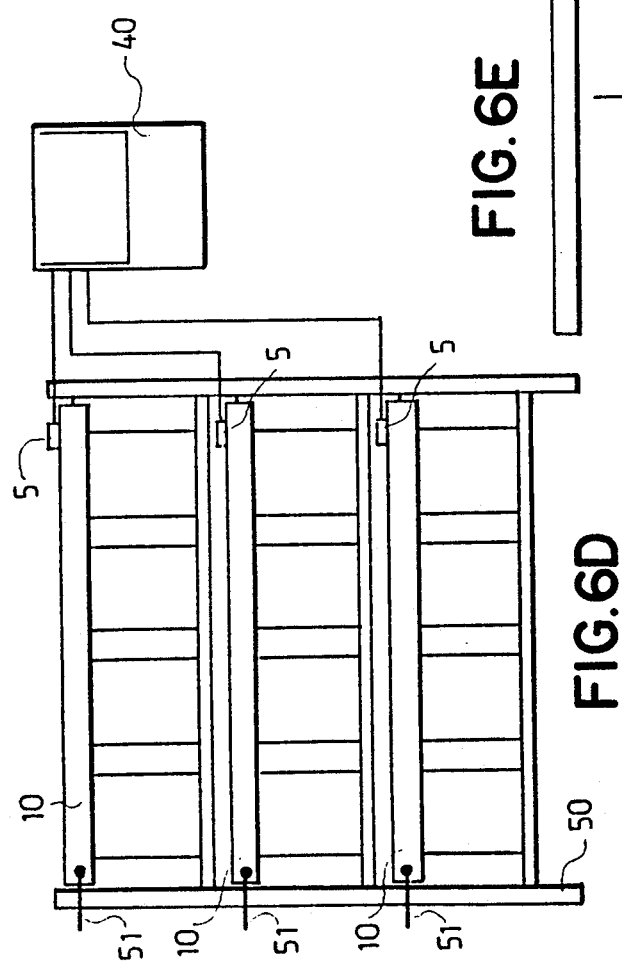
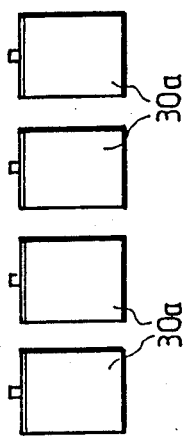
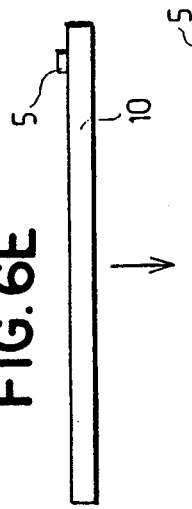
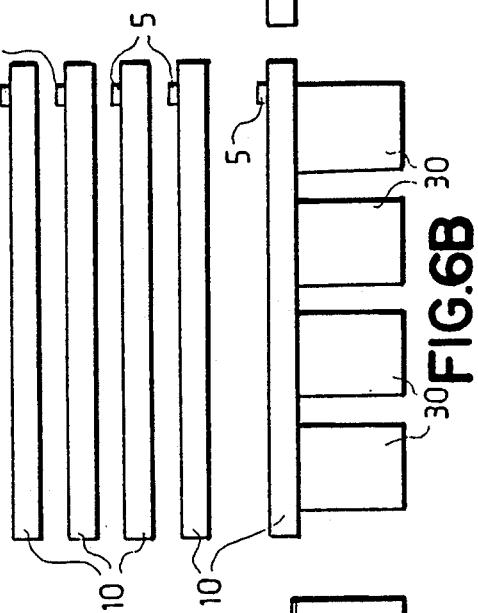
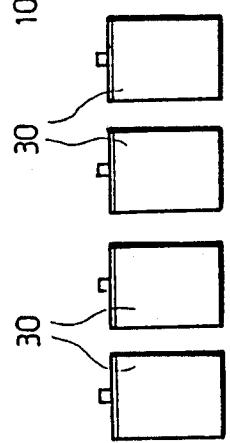

MEANS FOR ACID-FILLING AND FORMING

BACKGROUND OF THE INVENTION

The present invention relates to a means for acid-filling and forming storage batteries.

A storage battery finished in the assembly line requires acid-filling and thereafter forming, wherein the active material of said storage battery is converted into lead dioxide and lead with the aid of electric current. The forming is required to be performed in the storage battery immediately after the acid-filling.

These measures previously required much handwork and other manual activities as a result of which the acid-filling and forming of storage batteries have frequently created a significant bottleneck in the production line. Previously, for instance, all initial activities related to the forming, such as electrical couplings and placements of storage batteries into forming racks were performed manually. For that reason, the storage battery forming has furthermore constituted a considerable cost factor.

The storage battery formation have always been connected with gasification and sometimes splashing of acid, which in some instances could be quite vigorous. In the designs of the prior art, the gasification has generated a considerable problem with respect to occupational health because insufficient attention has been given to the collection of gases and splashes.

SUMMARY OF THE INVENTION

The primary object of the present invention is the elimination of the drawbacks related to the state of the art, and to provide an essential improvement in the known designs. For implementing these goals, the invention comprises a frame which is arranged to bind several storage batteries together into a series, and in which frame a duct system has been formed. The duct system is formed in direct contact with the cells of each storage battery fixed to the frame, so as to supply acid simultaneously into each cell. A circuit is provided for supplying a charging current, simultaneously to the terminals of each battery with the electrical interconnection between the terminals of each battery and the circuit being made by installing the respective battery within the frame.

Of the most outstanding advantages of the invention relative to the designs known in the art, the following may be considered. By using the invention, it is feasible to automate the acid-filling and forming of storage batteries so that both the acid-filling and forming can be performed simultaneously for a great number of storage batteries. The acid filling and the forming processes are thus made substantially more rapid and flexible. This prevents slowing down of the manufacturing process of storage batteries.

The means and the procedure of the invention moreover make it feasible that the encoding and product follow-up of storage batteries become substantially facilitated because e.g. a follow-up of the charging program for a plurality of storage batteries can, with the aid of the invention, be carried out simultaneously and fully automatically e.g. with a computer. The acid-filling and forming processes can, with the means of the invention, be easily automated.

Also regarding occupational health, the means and the procedure of the invention introduce into the technology of the prior art a significant improvement because in the design of the invention, the gases formed and splashes acid produced in the course of the forming process can be collected efficiently and filtered, and conducted away from work spaces. The other advantages and characteristic features become obvious from the detailed description of the invention, to which, however, the invention is not intended to be exclusively confined.

BRIEF DESCRIPTION OF THE DRAWING

The invention is described in the following in detail referring to the example presented in the figures of the drawing attached, wherein;

FIGS. 6A-6F presents schematically different embodiment steps of the procedure of the invention.

DETAILED DESCRIPTION

Figure 1:
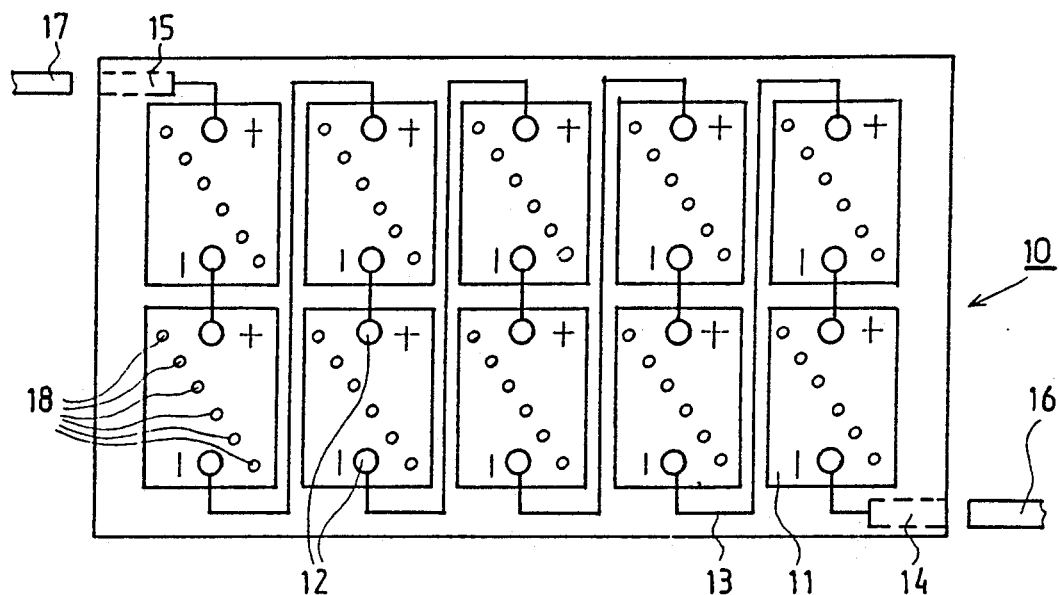
FIG. 1 presents schematically a forming plate to be used in the procedure of the invention in bottom view.
Figure 2:
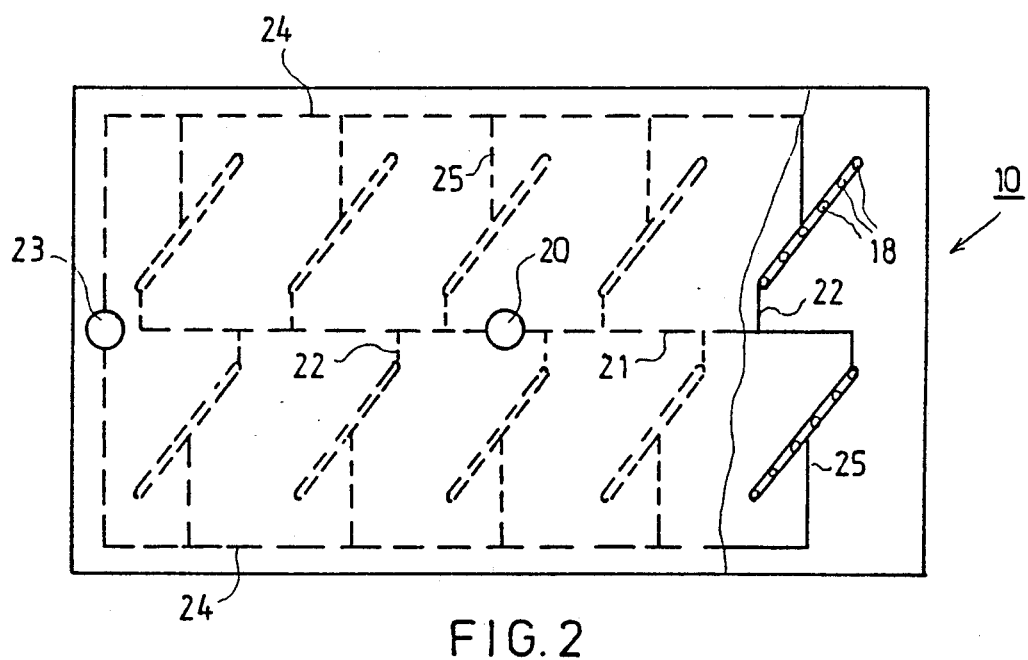
FIG. 2 presents schematically the forming plate in top view and partly sectioned.

In FIGS. 1 and 2 the forming plate of the invention is in general indicated by reference numeral 10. The forming plate 10 is configured to affix a given number of storage batteries mechanically thereto during the acid-filling and forming processes. For this purpose, grips or recesses 11 are provided on the undersurface of the forming plate 10 for receiving the storage batteries, and in addition, holes 12 have been produced on the undersurface of the forming plate 10, to which the terminals of the storage batteries to be attached to the forming plate 10 are intended to enter. The forming plate 10 of FIGS. 1 and 2 is intended for a series of ten storage batteries. The holes 12 for the storage battery terminals are coupled to one another with a circuit 13 provided on the plate 10. In addition, electrode couplings 14,15 coupled to said circuit 13 have been produced in said forming plate 10, to which electrodes 16,17 of the charging circuit are intended to be connected for forming storage batteries. After the storage battery series has been coupled to the forming plate 10, the circuit 13 thus connects the storage batteries mutually in series in the embodiment of FIG. 1. The circuit 13 may, of course be arranged in a manner deviating from FIG. 1., for instance in that the circuit is individually connected to each cell, or so that the circuit comprises a parallel connection.

Figure 3:
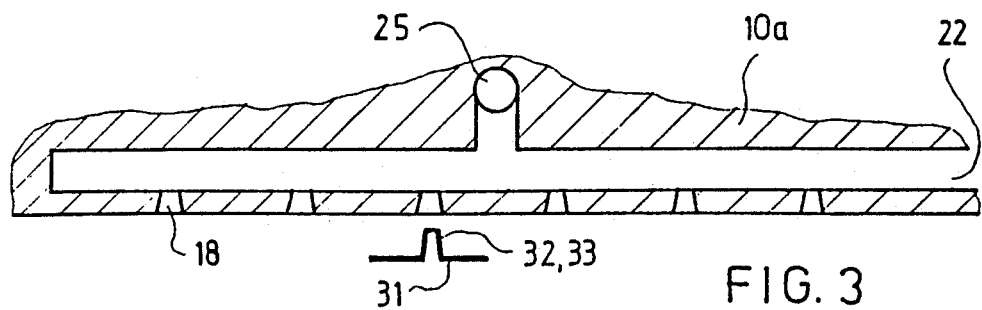
FIG. 3 presents in partial cross-sectional view the forming plate of the invention.
Figure 4:
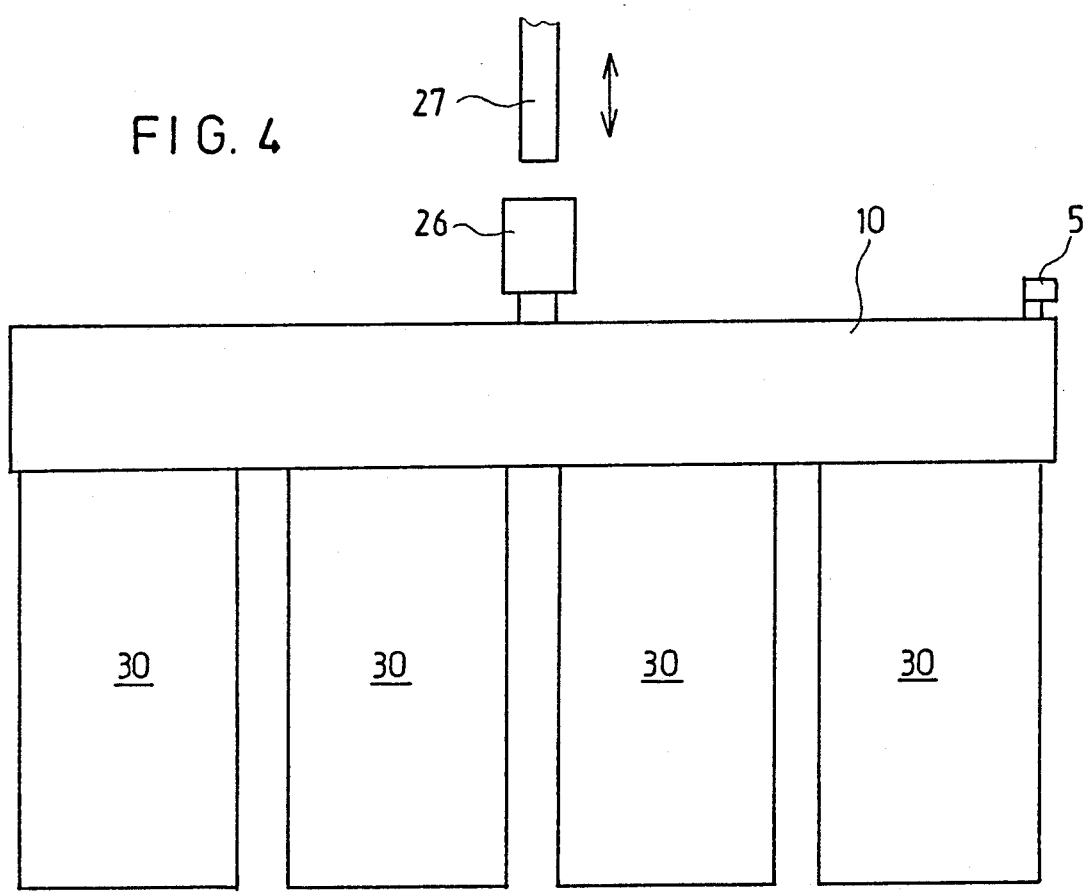
FIG. 4 presents schematically in parallel view the forming plate, to which the plates have been fixed for acid filling.
Figure 5:
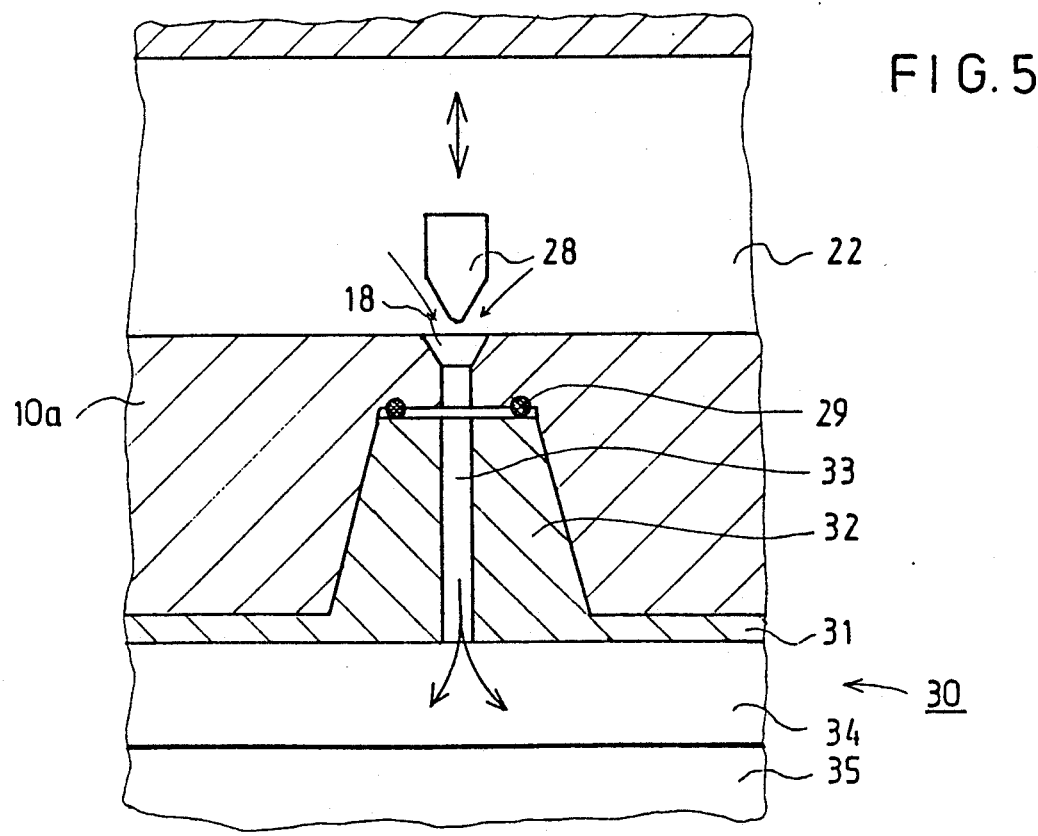
FIG. 5 presents an enlarged partial section of the forming plate at one acid aperture of one storage battery.

The forming plate 10 is used, in addition to storage battery forming, also for acid-filling of said storage batteries, and this action is, in addition to the electrical connections of FIGS. 1 and 2, demonstrated in FIGS. 3-5. As is seen in the figures, acid-filling apertures 18 are provided in the undersurface of the forming plate 10 for the cells of each storage battery 30 to be connected to the forming plate. Each of the acid-filling apertures 18 is connected to acid-filling ducts 22 formed within a frame 10a of the forming plate, the ducts 22 being, in turn, all in contact with an acid-filling line 21, or the main line. On the upper surface of the forming plate 10 an acid-filling aperture 20, opens into the acid-filling line 21. From the acid-filling aperture 20, the acid supplied into the forming plate 10 enters therefore along the acid-filling line 21 and the acid-filling ducts 22 into the acid-filling apertures 18 from which the acid is allowed to enter the cells of the storage batteries 30.

In addition, on the upper surface of the forming plate 10 there is a sniffle aperture 23, opening into sniffle lines 24 produced in the frame 10a of the forming plate. The lines 24 connect through distribution lines 25 into each acid-filling duct 22 above the acid-filling aperture 18. When filling storage batteries 30 with acid, and thereby forming the batteries vapors, and splashes are consequently not allowed to enter freely into the air, but they are conducted in a controlled manner from the sniffle aperture 23 into a desired collector. To the sniffle aperture 23 may advantageously be connected a gas collecting filter (not depicted), acting as a collector filter for splashes, acid vapors and other gases so that the filter prevents acid vapors or free acid from escaping into the air.

When storage batteries 30 have been connected to the forming plate 10, the acid-filling of the storage batteries 30 is first carried out. For this purpose, a feed hose 27 or equivalent is connected to the acid-filling aperture 20, e.g. with a quick coupler 26, from which the acid is conducted along the ducts produced in the frame 10a of the forming plate into the cells of each storage battery.

In FIG. 5 a detailed sectional image showing a connection of one cell of one storage battery into the acid filling aperture 18 of a forming plate is presented. As shown in FIG. 5, the forming plate 10 is intended for such storage batteries 30 in which a projection 32 has been formed on the cover 31 of the storage battery at each cell 35. The projection projects into an aperture provided for it in the frame 10a of the forming plate. In addition, the projection 32 is sealed by a sealing 29 into the frame 10a of the forming plate. Within the projection 32 there is formed an acid duct 33 which is in direct contact with a respective acid-filling aperture 18. Each acid-filling aperture 18 located in the frame 10a of the forming plate is moreover provided with a valve 28 presented schematically in FIG. 5, the valve dispensing a quantity of acid introduced into the cell 35 of the storage battery 30. The acid vapors produced in association with the forming of the storage battery 30 pass from a gas space 34 of the storage battery 30 through the acid-filling aperture 18 into the acid-filling duct 22, and therefrom onwards along the sniffler lines 25 and 24 into a gas collecting filter possibly connected to the sniffler aperture 23.

In FIGS. 6A–6F the procedure of the invention in steps for acid-filling and forming of storage batteries. In step A, the storage batteries 30 are delivered from a storage battery assembly line into acid-filling and forming. In step B, a forming plate 10 is fixed to a storage battery series. When the forming plate 10 has been connected to the storage batteries 30, the storage battery series and the forming plate 10 pass into the acid-filling step (step C). In step C, an acid-filling hose is coupled to the forming plate 10 with a quick coupler 26, through which storage battery acid is supplied into each storage battery 30 fixed to the forming plate 10.

After the storage battery 30 has been acid-filled, the forming plate 10 with the storage batteries 30 is moved into the forming step (step D). In step D, the forming plate 10 with the storage batteries 30 are installed to the forming rack 50. On the same rack 50, several forming plates 10 with their respective storage battery series may be installed. In the forming rack 50, the electrodes 16,17 shown in FIG. 1 are coupled into the forming plates 10, whereby each forming plate is connected with a supply circuit 51 of the charging current. When a sufficient number of forming plates 10 with respective storage battery series have been placed on the forming rack 50, the charging current is connected to the supply circuit 51 and the forming of the storage batteries 30 is carried out.

As is moreover presented in the figures of the drawings, each forming plate is provided with a sensor and identification plate 5 (FIG. 4), this being in an appropriate manner connected to the circuit 13 of each forming plate 10. At the same time, when the forming plates 10 are placed on the forming rack 50, each forming plate is by the identification plate 5, connected to the computer 40 by means of which the forming process is monitored. After the forming of the storage batteries has been performed, the forming plates 10 are detached from said forming rack 50. The forming plates 10 are, with their storage batteries moved to the subsequent step (step E) in which such forming plate 10 is detached from the storage battery series. Each forming plate 10 is moved back to the installation step (step B) of the forming plate. Thereafter, the acid-filled and formed storage batteries 30a can be transferred to the packing department (step F).

As is shown in FIGS. 6A–6F, the acid-filing and forming of the storage batteries 30 in the procedure of the invention have been carried out in an automated line in which a series of storage batteries progresses stepwise from one step to another. The forming plate and the method of the invention facilitate the automation and enable the acid-filling and forming of the storage batteries 30 to take place simultaneously for a comprehensive battery series automatically. In addition, the procedure of the invention enables an efficient identification and follow-up of the acid-filling and forming program for storage batteries 30 because the charging program is controlled with the aid of a computer 40. Each cell may be encoded prior to its entrance into the acid-filling and forming process, for instance in association with the storage battery casing, wherein an individual encoding plate is provided on the cover of each storage battery. The product follow up can thus be done substantially more efficiently than before. With the method of the invention, the rejects can be removed from the series and from the production line immediately upon an indication from the computer that a storage battery series or an individual storage battery is faulty.

The invention is described as an example referring to the figures of the drawing attached. The invention is however, not intended to be limited exclusively to the example presented in the figures, and modifications are feasible within the scope of the inventive idea presented in the following claims below.

I claim:

1. Apparatus for filling and forming batteries, the apparatus comprising
    a frame for holding a plurality of storage batteries simultaneously;
    a duct system being formed within the frame and being arranged to contact cells of respective ones of the batteries, said duct system serving to supply acid to each cell simultaneously; and a battery charging circuit with electrical conductors supported by said frame, the circuit being operative to supply charging current to the batteries; and wherein the batteries are connected by their respective terminals to the conductors of said circuit upon an installing of the batteries in said frame.

2. Apparatus according to claim 1 wherein said duct system comprises an array of acid-filling apertures disposed on said frame and located for communication with said cells;

an inlet port connected via ducts of said duct system to said acid-filling apertures;

a plurality of sniffler lines and a plurality of distribution lines connected thereto, said sniffler lines being connected to said acid-filling apertures through said distribution lines and via ducts of said duct system;

a sniffler output port connected to said plurality of sniffler lines; and filter means connected to said sniffler output port for receiving acid splashes and acid vapors associated with filling and forming of the batteries.

3. Apparatus according to claim 1, and further comprising a supply circuit connected to an external source of current, a plurality of sensor elements disposed on said frame for monitoring charging of said batteries with current from said external source; and wherein said battery charging circuit includes connections disposed on said frame to provide electrical connection with said supply circuit.

4. Apparatus according to claim 1 wherein said battery charging circuit provides for an arrangement of electrical interconnection of the storage batteries on said frame including a series connection.

5. Apparatus according to claim 1 wherein said circuit includes an individual connection for each respective one of said batteries storage.

6. Apparatus according to claim 1 wherein said battery charging circuit provides for an arrangement of electrical interconnection of the storage batteries on said frame including a parallel connection.

7. Apparatus according to claim 1 further comprising gripping means disposed on a surface of said frame for securing the batteries to said frame.

8. Apparatus according to claim 7 wherein said gripping means comprises recesses disposed on said surface of said frame for receiving an outer case of each respective one of said batteries, and said gripping means including holes from which terminals of the batteries extend for making electrical connection with said battery charging circuit.

* * * * *